United States Patent
Ozzie et al.

(10) Patent No.: US 6,446,113 B1
(45) Date of Patent: Sep. 3, 2002

(54) METHOD AND APPARATUS FOR ACTIVITY-BASED COLLABORATION BY A COMPUTER SYSTEM EQUIPPED WITH A DYNAMICS MANAGER

(75) Inventors: Jack E. Ozzie, Chester, NH (US); Raymond E. Ozzie, Manchester, MA (US)

(73) Assignee: Groove Networks, Inc., Beverly, MA (US)

( * ) Notice: Subject to any disclaimer, the term of this patent is extended or adjusted under 35 U.S.C. 154(b) by 0 days.

(21) Appl. No.: 09/356,930

(22) Filed: Jul. 19, 1999

(51) Int. Cl.[7] .............................................. G06F 13/00
(52) U.S. Cl. ....................... 709/204; 709/203; 709/217
(58) Field of Search ................................. 709/200, 201, 709/203, 204, 205, 217, 218, 219, 224, 226, 229, 230, 245, 250

(56) References Cited

U.S. PATENT DOCUMENTS

| | | | | |
|---|---|---|---|---|
| 4,974,173 A | * | 11/1990 | Stefik et al. ................ | 340/717 |
| 5,008,853 A | * | 4/1991 | Bly et al. .................... | 340/717 |
| 5,388,196 A | * | 2/1995 | Pajak et al. ................. | 395/153 |
| 5,538,255 A | | 7/1996 | Barker ........................ | 463/41 |
| 5,892,949 A | | 4/1999 | Noble ......................... | 717/125 |
| 5,899,810 A | | 5/1999 | Smith .......................... | 463/42 |
| 6,049,334 A | * | 4/2000 | Bates et al. ................. | 345/755 |

FOREIGN PATENT DOCUMENTS

| EP | 0 822 493 | 2/1998 |
|---|---|---|
| WO | WO 99/21117 | 4/1999 |

OTHER PUBLICATIONS

Berglund, et al.; Amaze: A Multiplayer Computer Game; IEEE Software; May 2, 1985; pp. 30–39; New York, New York.

Koch, Michael, "Design Issues and Model for Distributed Multi-User Editor", Computer Supported Cooperative Work, 1995, 359–378, vol. 3, Kluwer Academic Publishers, Boston, MA.

Sun, Chengzheng, et al., "Achieving Convergence, Causality–Preservation, and Intention–Preservation in Real–Time Cooperative Editing Systems", ACM Transactions on Computer–Human Interaction, Mar., 1998, pp. 2–42, vol. 5, No. 1.

Begole, James "Bo", "Flexible Collaboration Transparency", Internet address http://simon.cs.vt.edu/~begolej/Papers/Prelim/FlexibleCollabTrans.pdf0.

Yang, Y., et al., "A Web–Based Synchronous Cooperative Editor for Software Development", ICSE–98 Workshop on Software Engineering over Internet address www3.cm.deakin.edu.au/~yun/ICSE–W98/editor/index.htm,1998.

* cited by examiner

*Primary Examiner*—Moustafa M. Meky
(74) *Attorney, Agent, or Firm*—Kurdirka & Jobse, LLP (57) ABSTRACT

An activity-based collaboration system provides communication and other shared and mutual activities between individuals and small groups in shared private spaces, called "telespaces". In the system, participants or members of a telespace interact through personal computers, Internet appliances or other network-capable devices, which can communicate with one-another over a network, e.g., the Internet. Each telespace is an instantiation of an activity operable on each of the network-capable devices of members of the telespace. Each activity includes a tool for initiating data change requests (called "deltas") responsive to telespace member interactions, and a data-change engine, separate from the tool, for maintaining telespace data pursuant to a common data model, usually activity-specific, in memory. Each network-capable device also includes a dynamics manager, responsive to the deltas, for directing the data-change engine to make changes to the local copy of data.

31 Claims, 6 Drawing Sheets

METHOD AND APPARATUS FOR ACTIVITY-BASED COLLABORATION BY A COMPUTER SYSTEM EQUIPPED WITH A DYNAMICS MANAGER

CROSS REFERENCE TO RELATED APPLICATIONS

The following co-pending, commonly-assigned U.S. patent applications are related to the present application, and incorporated by reference herein in their entirety:

Ser. No. 09/357,007, entitled "Method and Apparatus for Activity-Based Collaboration by a Computer System Equipped With a Communications Manager," filed on even date herewith by Raymond E. Ozzie, et al, still pending.

Ser. No. 09/356,148, entitled "Method and Apparatus for Prioritizing Data Change Requests and Maintaining Data Consistency in a Distributed Computer System Equipped for Activity-Based Collaboration", filed on even date herewith by Raymond E. Ozzie and Jack E. Ozzie, still pending.

FIELD OF THE INVENTION

The invention relates generally to computers interconnected for communication over a network such as the Internet, and more particularly to a distributed computer-based system for coordinating and otherwise maintaining data pursuant to a distributed data model.

BACKGROUND OF THE INVENTION

The Internet has established a dynamic, public environment for communication and interaction among its millions of users. In business, the Internet has redefined vendor-manufacturer, manufacturer-distributor, distributor-customer, and other relationships. With extension of the Internet technology into internal, secured networks of individual companies, the "intranet" or "private Internet", as it is called, has enabled new forms of document and information sharing between individual employees and work groups using company directory and network infrastructure. On-line services, such as electronic bulletin boards and chat rooms, electronic commerce, and technical support for products, are available on the World Wide Web ("WWW" or "Web") operating over the Internet.

The Internet has, at its core, a server-client architecture, in which individual clients (i.e., Internet-content users) interface via computer-executable applications such as browsers with servers (i.e., Internet-content providers) to obtain documents from Web sites. Browsers are software programs that enable personal computers to request, receive (e.g., download), interpret, and present Internet documents, and generally navigate the Internet. Web servers typically have standard interfaces for running external programs, the most common is the Common Gateway Interface (CGI). Web sites are collections of documents, usually consisting of a home page and related, linked documents, located on servers remote from the client. The documents can be compound documents, containing data, graphics, video, sound, and/or other types of media, as well as links to other documents. Essentially, the WWW is a web of interconnected documents, or, more precisely, document objects that are located at various sites on the Internet.

Among the types of document objects on the WWW are documents and scripts. A script is an executable program, or a set of commands stored in a file, that can be run by a Web server to produce a document that is then returned to the Web browser. Typical script actions include running library routines or other applications to get information from a file or database, or initiating a request to get information from another computer, or retrieving a document corresponding to a selected hypertext link. A script is run on the Web server when, for example, a user selects a particular hypertext link in the Web browser.

Underlying the Internet technology are advances in standardization, including personal computer hardware, software, network protocols, and infrastructural conventions (such as the "Uniform Resource Locator" or "URL"). URLs provide location addresses for all document objects on the WWW. A URL uniquely references a document object and often defines an access algorithm using Internet protocols.

"Internet protocols", as that expression is used herein, are defined as current or future language conventions and present or future communication protocols that are generally-accepted and used for generating messages including documents for transmission over the Internet, or for transmitting such messages over the Internet, respectively. Such language conventions include, for example, at present, Hypertext Markup Language ("HTML") and extensible Markup Language ("XML"). Such communication protocols include, for example, at present, Hypertext Transfer Protocol ("HTTP"), TCP/IP, FTP and GOPHER. Those skilled in the art will be familiar with these language conventions and protocols.

HTML is a language used for writing hypertext documents, containing multimedia content and links to other documents. An HTML document includes a hierarchical set of markup elements, where most elements have a start tag, followed by content, followed by an end tag. Tags are enclosed in angle brackets ("<" and ">") and indicate how the document is structured and how to display the document, as well as destinations and labels for hypertext links. There are tags for markup elements such as titles, headers, text attributes such as bold and italic, lists, paragraph boundaries, external links to other documents, and internal links to other parts of the same document, graphic images, and many other document features. Many books are in wide circulation regarding programming using HTML.

XML is another of the language conventions included in the Internet protocols. XML is compatible with and complementary to HTML, at least in its current version. It is a standard way of describing a class of data objects as stored in computers, called XML documents, and behavior of programs that process these objects. XML documents are made up of storage units called entities, which contain either text or binary data. Text is made up of characters, some of which form the character content of the documents, and some of which form markup. Markup encodes a description of the document, such as its storage layout and logical structure. A software module called an XML processor is used to read XML documents and provide access to their content and structure. Further information regarding XML can be had with reference to Version 1.0 of the XML specification, available at <HTTP://www.w3.org/XML>, and incorporated herein by reference.

A Web server and a Web browser communicate typically using the HTTP message protocol and the underlying TCP/IP data transport protocol of the Internet. In HTTP, the Web browser establishes a connection to a Web server and sends an HTTP request message to the server. In response to the request message, the Web server checks authorization, performs any requested action such as downloading a document identified by its URL, and returns an HTTP response message containing either the HTML document resulting from the requested action or an error message. The returned document may simply be a static file stored on the Web server, or it may be generated dynamically using a script called in response to the request message.

To take advantage of the Internet, tools and resources have been developed in compliance with the Internet protocols, including company-critical applications such as e-mail. E-mail is electronic mail, by means of which documents are sent and received electronically at selected addresses. It has been estimated that a vast majority of Internet-based interaction is through the use of e-mail and other browser-based media that follow a "document send and receive" model. Perhaps due to that model, users often view the Internet as inherently "peer-to-peer", with individuals accessing documents provided by other individuals, without intervention by a higher authority.

The Internet is dynamic and flexible in providing users with entertaining and useful ways of communicating, though it does not meet all the needs of users. While users interact increasingly through the Internet, they continue to interact "off" of the Internet in more conventional ways, such as through multi-medium (phone, fax, whiteboard), multi-temporal (real-time, overnight mail) and other informal means of communication.

It would be desirable to extend the Internet paradigm to personal and private communications and other shared and mutual activities between individuals and small groups in shared private spaces. Such interactions should preferably occur instantly, directly, and confidentially between participants' personal computers, or other network-capable devices, without exposing such interactions to server bottlenecks through which Internet traffic is typically funneled to third-party Web sites where communications can be intercepted and confidences violated.

It would also be desirable to provide a technique that allows users at various remote sites to share and edit documents on a peer-to-peer basis, while maintaining copies of the documents at local sites. Such a technique should permit any of the users to issue change requests regarding the documents, which changes are then made asynchronously to the copies at all the local sites in a coordinated fashion.

SUMMARY OF THE INVENTION

The invention resides in an apparatus called an activity, which is operable in a personal computer system, communication appliance or other network-capable device, for performing a shared, focused task with other, remotely-located users, such as, for example, a "chat", gaming, or business application. The activity includes a tool for generating data change requests, comprising deltas, responsive to user interactions. The activity also has a data-change engine for maintaining data in preferably non-volatile, persistent memory pursuant to a data model. The data-change engine includes a tool end for receiving deltas from the tool, providing the deltas with activity-specific commands for carrying out the request, and providing notification to the tool of data changes caused by delta execution. The data-change engine also includes a dynamics manager end for receiving, from a dynamics manager, data-change directions to execute the deltas, i.e., perform the deltas' commands to make the requested changes to the data.

In another aspect, the invention resides in a system for providing communications and other shared and mutual activities between individuals and small groups in shared private spaces, called "telespaces". In the system, participants or members of a telespace interact through network-capable devices, which can communicate with one-another over a network, e.g., the Internet and store individually local copies of telespace data. Each telespace is an instantiation of one or more activities operable on each of the network-capable devices of members of the telespace. Each activity includes one or more tools for initiating data change requests or deltas responsive to telespace member interactions. Each activity also includes one or more data-change engine, separate from the tools, for maintaining the local copy of telespace data pursuant to a common data model. The data model is, for example, activity-specific, and preferably telespace-wide. Each network-capable device also includes a dynamics manager, responsive to the deltas, for directing the data-change engine to execute the deltas by making the requested changes to the local copy of data, and for coordinating the execution of the deltas from the various network-capable devices.

In yet another aspect, the invention can be practiced in a networked system including plural, preferably network-capable devices at different locations connected for communication preferably in accordance with Internet protocols. Each network-capable device has (a) a memory for storing a local copy of activity-related data pursuant to a common data model, (b) one or more activities, each including one or more tools and corresponding data-change engines as described above, (c) a communications manager for causing deltas to be shared among all the network-capable devices of the networked system that participate in the telespace to which the deltas pertain; and (d) a dynamics manager for coordinating execution of both locally-generated and remotely-generated deltas. The user interactions can be initiated, and the resulting deltas generated, at any of the network-capable devices of the networked system, and the deltas are transmitted to each of the devices preferably over the network. The dynamics managers direct the operation of their local data-change engines, preferably to prioritize execution of deltas and to maintain substantial consistency of the data across the networked system. The networked system thus allows users at various remote sites, e.g., to share and edit data or perform other activities independently, on a peer-to-peer basis, while maintaining substantially consistent copies of the data at each of the network-capable devices for use even when disconnected from the network.

In still another aspect, the invention can be implemented as an activity-based collaboration (ABC) system for interpersonal interaction. The ABC system includes plural, network-capable devices connectable, e.g., via public networks (e.g., the Internet or wide area networks (WANs)) or via private networks (e.g., local area networks (LANs) or intranets), by cable, fiberoptics, infrared (IR) or other forms of communication links, to form the above-described networked system. Each network-capable device is equipped with the above-described memory, and a framework including one or more dynamics managers. The network-capable devices are preferably plug-compatible with the public network infrastructure, personal desktop applications and infrastructure (sometimes called "personal Internets"), and, where applicable, a company intranet. The ABC system preferably uses dynamic, snap-in activity components, each for performing a specific task, such as "chat", document editing, gaming, etc. The activity components can comprise software made available, for example, as shrink-wrapped products or downloaded over the network, e.g., the Internet. The activity components can operate through common application programming interfaces (API) with the framework. Accordingly, the framework can be viewed and function as a platform for applications in the form of the activity components.

Thus, the invention can be implemented as separate commercial products and services, including provision of the individual activity components, the framework for individual network-capable devices, and/or networked or ABC system, as well as communication services for effecting interactions between devices forming the system.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

A. Terminology

It may prove useful to introduce at the outset certain terminology and abbreviations used in this specification, including: activity, client, communications manager, component, controller, delta, device, dynamics manager, engine, framework, identity, member, navigation, person, server, telespace, tool, URL, and XML.

"Activity" refers to what a user actually does with the ABC system in order to interact with other users. The term "activity" can have either of two meanings, depending on context. From an "outside view," it means a runtime interaction between the ABC system and a computer user; e.g., an activity of this type permits users to draw on a shared whiteboard or permits two or more users to chat in real-time. An activity in this sense can also be a background service (i.e., agent) running on a user's behalf on a local or server device, such as an archive server agent, or an inbound FAX agent. From an "inside view" of a software designer, "activity" means a modular, computer-executable program that can run on a user's personal computer or other form of device and perform a focused task. An activity in this sense is comprised of two types of components, a tool and an engine, which are combined at design time to create an "activity template". An activity template can be distributed in many ways, for example, as shrink-wrapped software or as software that can be downloaded off the Web. It is envisioned that widely-distributed programs used for word-processing, spread-sheets, etc. will have versions designed for use in the ABC system, and sold as such in activity template form conforming to ABC system programmer interfaces.

"Client" refers to a user's personal computer, communication appliance or other form of device that is capable of human interaction, and connectable to a network, e.g., the Internet. Background programs that run on the user's personal computer are called "Client Service Controllers". Foreground user interface (UI) programs that run on the user's personal computer are called "Client UI Controllers".

"Communications Manager" refers to a mechanism for directing inbound and outbound deltas to appropriate destinations. The communications manager can be implemented, for example, as a computer-executable program, which directs locally-initiated deltas created by a tool/engine pair for transmission over a network, e.g., the Internet, to another remote personal computer or other form of network-capable device, or to a relay when that remote device is not connected to the network; and which directs remotely-generated deltas received over a network, e.g., Internet, to a dynamics manager.

"Component" refers to a computer-executable program and its resources used within an activity. All components are identified by URLs. It is envisioned that the Web can be a global repository for components, with versions securely downloadable onto an appropriate component platform in the ABC system.

"Controller" refers to a top-level, computer-executable program that drives the "inner" functionality of the ABC system. A controller is tuned for a given platform, for example, a UNIX™ Daemon controller, or a controller for Microsoft Windows™ running on an Intel™ microprocessor-based computer system. Two general types of controllers are a service controller, which runs as a background process generally invisible to users, and a user interface (UI) controller, which is interactively controlled by a user.

"Delta" refers to a self-contained unit of data that contains one or more tool-to-engine requests (i.e., notifications or prompts regarding desired changes to the data). Tools initiate delta creation by the dynamics manager in response to user interaction, and submit them to engines for asynchronous execution, as described below, under the direction of a dynamics manager. A delta has a specific format, including a header portion for providing control information and a payload portion for providing information regarding the data to which the request pertains. An individual delta can have one or more payloads, and where multiple payloads are employed, each can be targeted to telespace members with unique device capabilities or user roles. Tools request information regarding potential data changes from engines for display or other form of presentation to users, and are asynchronously notified when deltas cause display changes.

"Device" refers to a physical hardware device, such as a personal computer (pc) or communication appliance, which, for purposes hereof, unless the context indicates otherwise, is typically network-capable, i.e., can communicate with other network-capable devices over the network, e.g. the Internet using Internet protocols. All devices are assigned a unique identity code by the ABC system, have URLs, and are distinct from the persons using the devices. A device potentially hosts many telespaces. A device can be, for example, a pc, cellular telephone, fax machine, hand-held organizer, cable TV set top box, electronic entertainment unit (such as electronic toys and games and stereo equipment, or any other such network capable appliance, equipment on product).

"Dynamics manager" refers to the part of the framework of the ABC system that facilitates the creation and coordinates the execution of deltas. The dynamics manager can be implemented, for example, as a computer-executable program that runs on a user's personal computer or other form of network-capable device.

"Endpoint" refers to a unique pairing of a device and a person. The ABC system uses this concept as a method of uniquely distinguishing a person among multiple users of a device, or devices among multiple computers used by the same person.

"Engine" refers to what can be called the "bottom half" of an activity that implements the management and modification of persistent storage and data structures within the ABC system. Engines are packaged as components, have no user interfaces themselves but rather depend on their corresponding tools for user interfaces, and are substantially portable. Engines preferably exist exclusively to serve their corresponding tools. Engines preferably operate in universal synchrony.

"Framework" refers to the "inner workings" of the ABC system and contains most of its subsystems, including the dynamics manager, but no user interface. The framework is a computer-executable program that can run on a user's personal computer or other form of network-capable device, and sits logically between the high-level controllers and the activities.

"Identity" is generally synonymous with "person", though generally refers to one of the names, represented by an URL, by which a person is known by others. This concept comes into play because the ABC system embraces the notion that a person may have many identities or aliases, and, for example, many different URLs.

"Member" refers to a participant within or subscriber to a telespace, and is generally synonymous with the person portion (as opposed to device portion) of an endpoint when referring to telespace membership.

"Navigation" refers to the act of moving between URLs, and is analogous in the ABC system to navigation between Web pages and sites by a Web browser.

"Person" refers to a human being, or a server acting as a human's proxy, and generally refers to one who is participating in activities within a telespace. Each person has one or more identities, each of which is uniquely identified with an URL.

"Server" refers to a device that is normally incapable of direct human interaction and can only run as background programs under service controllers.

"Telespace" refers to a virtual place were people gather to participate in one or more activities, and where people share things. The telespaces and the results of activities are persistently stored in memories on users' personal computers or other forms of network-capable devices. A telespace is kept in synchrony between a user's device and other peoples' devices. A telespace represents the logical unit of "membership" and access to activities. A telespace is an instantiation of one or more activities.

"Tool" refers to what can be called the "top half" of an activity that implements the activity's user interfaces. Tools are packaged as components, initiate delta creation in response to user gestures, and interact with corresponding engines of the individual activities to perform specific tasks.

"URL" is an abbreviation for universal resource locator, which is an unique structured address of a resource such as a document, and, in some instances, represents a method by which a resource should be handled. URLs are used herein for substantially all persistent objects, user-visible objects, and external program-visible objects.

"XML", as noted above, is an abbreviation for eXtended Markup Language, which is a standard, structured data format derivative of SGML intended for use on the Web. Depending on the context it also refers to an in-memory object structure used in the ABC system, which is compliant with the XML standard's semantics. Many XML concepts are used herein, such as "documents", "elements", "tags", "attributes", "values", "content", "entities", "links", and "pointers". XML is used herein, for example, for structuring data in a document.

B. Conventional Computer System

Figure 1:
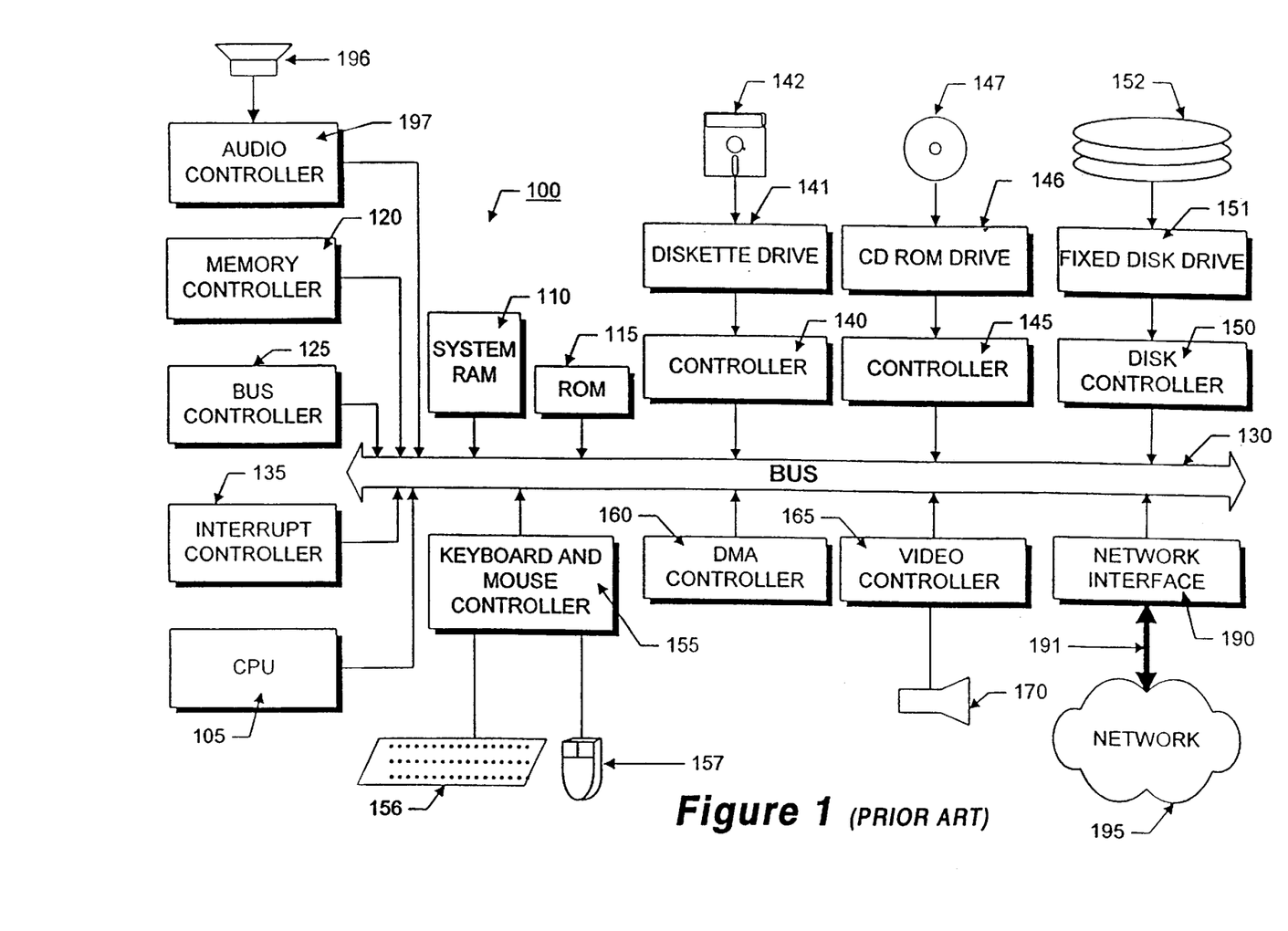
FIG. 1 is a block diagram of an illustrative architecture of a conventional computer system.

FIG. 1 illustrates a conventional system architecture for an exemplary computer system 100, with which the disclosed invention can be implemented. The exemplary computer system of FIG. 1 is discussed only for descriptive purposes, however, and should not be considered a limitation of the invention. The invention is further not limited to devices traditionally thought of as computer systems, since it may be implemented in any of various types of network-capable devices, including, e.g., video game consoles, personal appliances or cable set-top boxes. Although the description below may refer to terms commonly used in describing particular computer systems, the described concepts apply equally to other computer systems, including systems having architectures that are dissimilar to that shown in FIG. 1. For example, cable set-top boxes may not contain mass storage but do contain video tuners built with digital signal processors.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer system 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Computer system 100 also includes a network adapter 190 that allows the client computer 100 to be interconnected to a network 195 via a bus 191. The network 195, which may be a local area network (LAN), a wide area network (WAN), or the Internet, may utilize general-purpose communication lines that interconnect multiple network devices.

Computer system 100 generally is controlled and coordinated by operating system software. Among other computer system control functions, the operating system controls allocation of system resources and performs tasks such as process scheduling, memory management, networking and I/O services.

C. Conventional Approach to Controlling a Data Model

Figure 2:
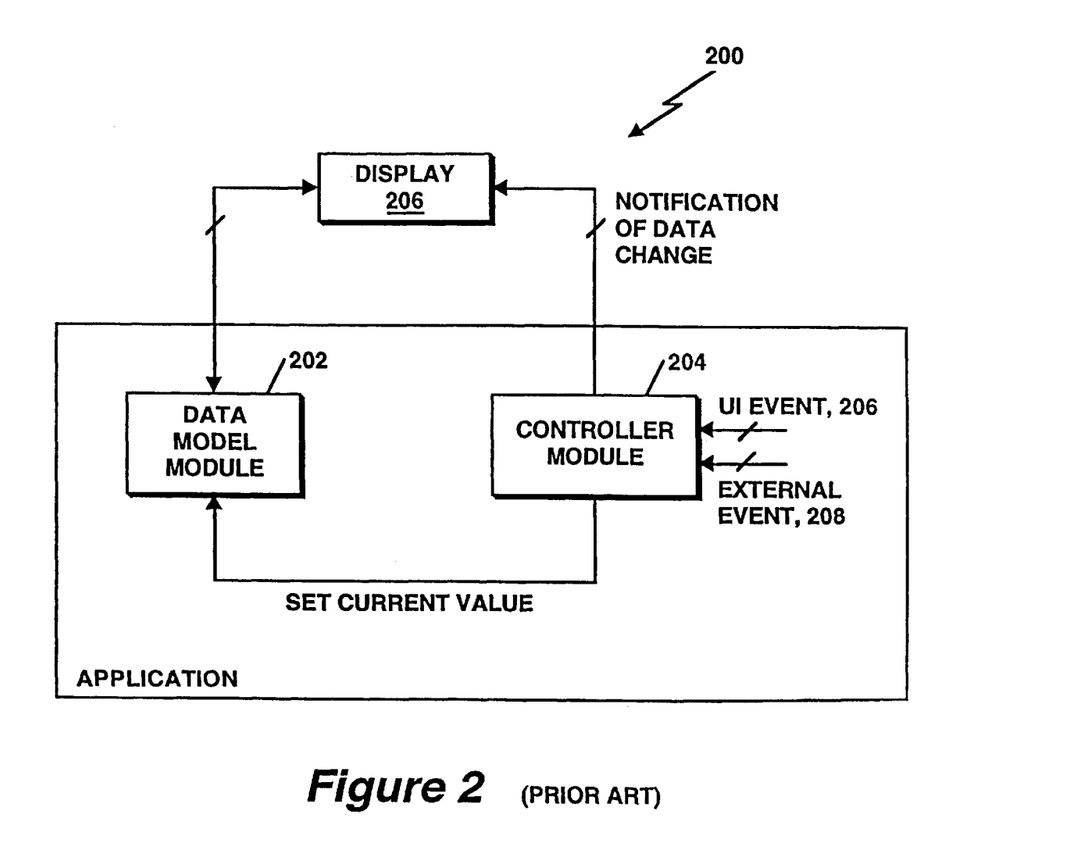
FIG. 2 is a block diagram of a conventional application run on the computer system of FIG. 1, in which a control module is responsible for both interfacing with a display or other user interface and for maintaining data in accordance with a data model.

FIG. 2 shows a conventional system 200 for controlling a data model using a technique known as "model view control". In system 200, a data model module 202 stores and maintains data, for example a database, in accordance with a data model. A controller module 204, responsive to a locally initiated event 206 (such as a user input) or to an externally initiated event 208 (such as event notifications received from remote computer systems), directs a "set current value" command to the data model module 202 to cause a change in the stored data. The controller module 204 notifies an output device such as display 206 of the data change. The display 206 obtains the changed data from the data model module 202 and updates the display of the data so that the current data can be viewed by a user. The foregoing technique is strictly event driven and linear in operation. Typically, internal or external events that cause the controller module 204 to command a change to the data are stored in a FIFO (first-in, first-out) buffer in the controller module 204, and then handled in the order in which the event notification reaches the controller module. Typically, also, no provision is made in system 200 for global consistency issues, that is, for assuring that copies of the model data in the system 200 are consistent with data in other remote systems.

The conventional approach for controlling a data model as exemplified in the system 200 was appropriate in an age in which computer systems, whether mainframes or personal computers, operated in relative isolation. With the advent of the Internet, computer users demand improved ways of collaborating, and the invention provides what can be called "model mediated control", in which a dynamics manager mediates changes effected by the data-change engine to the data model.

D. Internet Paradigm for Intercomputer Operation

Figure 3:
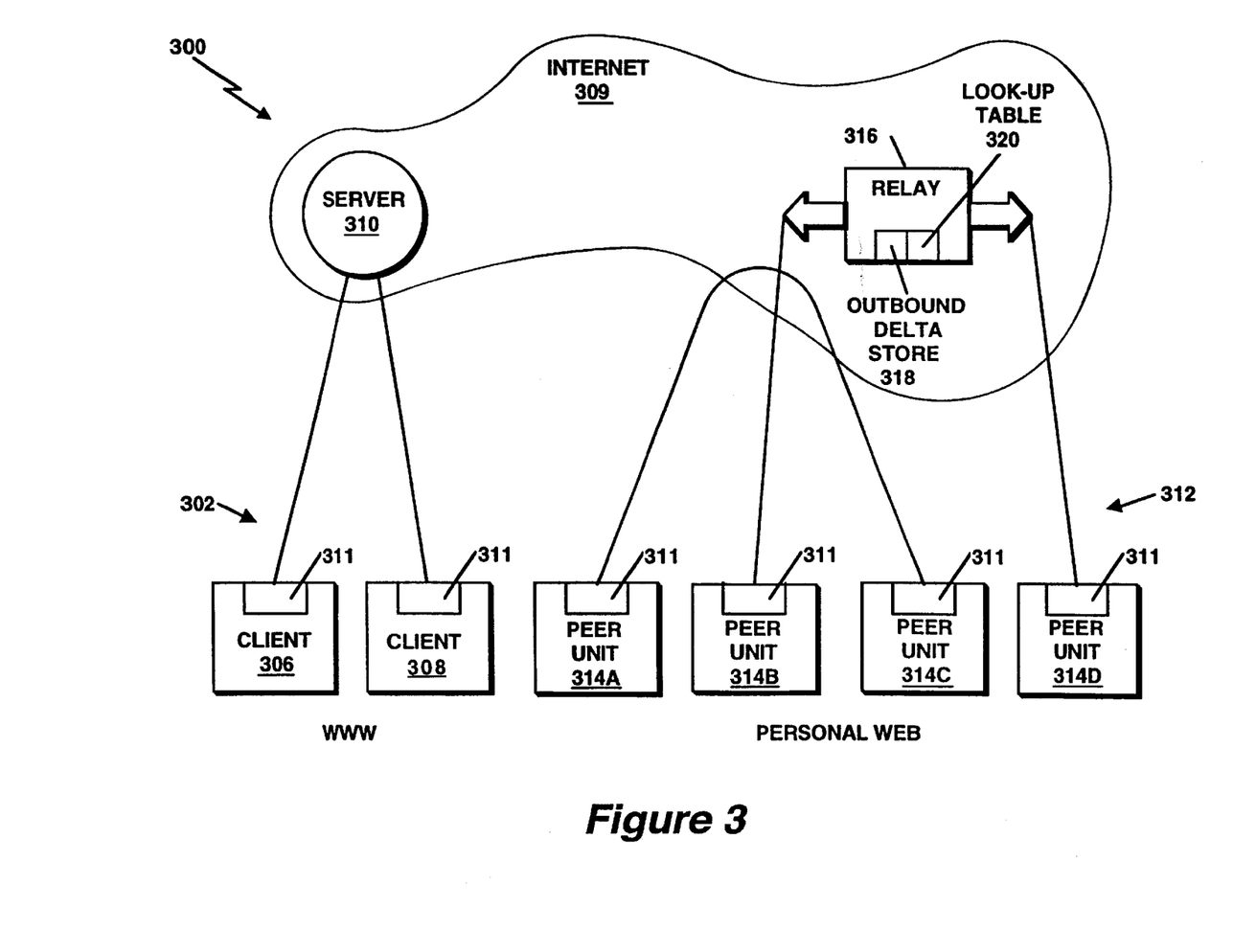
FIG. 3 is a block diagram of an Internet-based system, showing both a client-server system for the WWW and a peer-to-peer system for a personal Web in accordance with an embodiment of the invention.

FIG. 3 illustrates an Internet environment 300, in which the present invention can be advantageously employed. From the perspective of a user, in a conventional client-server view 302, individual clients 306, 308 separately communicate over the Internet 309 with a server 310. Each client 306, 308 can direct a request through the Internet 309 to the server, and, responsively, the server 310 may respond to the request, for example, by providing documents stored on the server over the Internet 309 to the clients. Each server 310 and client 306, 308 can be implemented as a personal computer as illustrated in FIG. 1 (with certain UI components optional in the case of the server), capable of execution of appropriate programs such as a client browser 311 and/or other communication interface, as described below. In a peer-to-peer view 312 of Internet use, the users' computer systems constitute peer units 314A–D, and communications through the Internet can be directed from one peer unit to another, without apparent intermediaries. Each peer unit 314A–D can be implemented as a personal computer such as that illustrated in FIG. 1 or other form of network-capable device. The invention can be implemented advantageously in either clients 306, 308, or peer units, 314A–D, though that description will focus on implementation with a peer-to-peer view of the system.

As will be explained in more detail below, such peer-to-peer communications can be made directly or via a relay device 316. The relay device 316 is preferably a "store and forward", which can store messages destined to a peer unit 314 which is temporarily disconnected from the Internet, and later, on reconnection, can forward the messages to that peer unit.

E. ABC system Architecture and Operation

Figure 4:
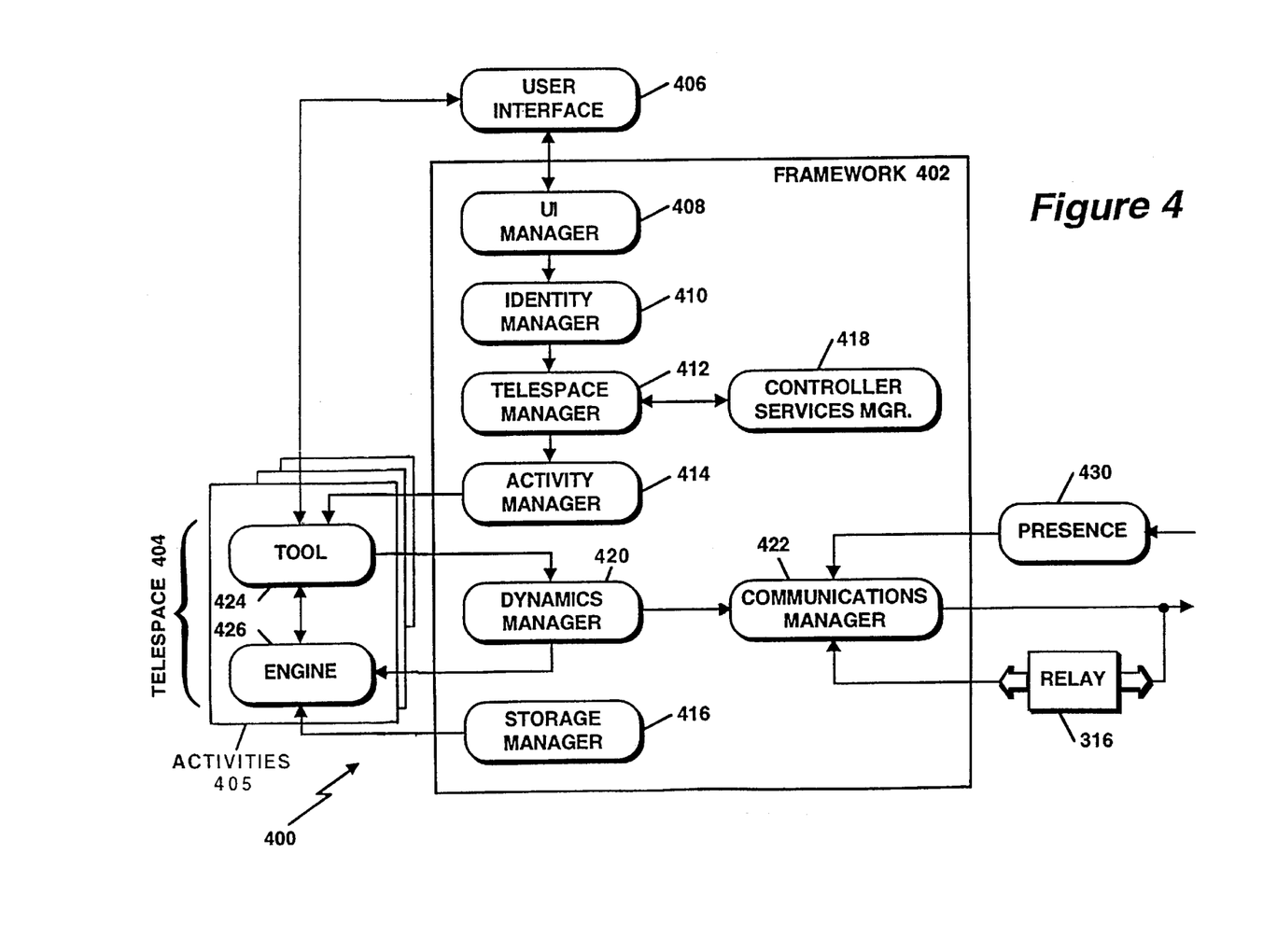
FIG. 4 is a block diagram of a portion of ABC system as implemented on the computer system of FIG. 1 in accordance with an embodiment of the invention.

FIG. 4 shows the ABC system 400 as implemented on one of the peer units 314A–D, such as, for example, peer unit 314A. The ABC system on peer unit 314A has a framework 402, at least one telespace 404 instantiating one or more activities 405, and a user interface 406. The framework 402 preferably provides a platform for servicing a number of telespaces 404. The framework 402 preferably is of module construction, with a programmer interface on which the activities run and through which they communicate with framework components.

The framework 402 includes a user interface manager 408, identity manager 410, telespace manager 412, activity manager 414, storage manager 416, controller services manager 418, dynamics manager 420, and communications manager 422.

The user interface (UI) manager 408 is responsible for managing shared services for a number of user interface controllers (not separately shown). The UI manager 408 manages layout of activities within panes of a display window, and otherwise provides a desired "look and feel" for the user interface. The UI manager 408 also manages activity navigation (for example, go to, next, previous, etc.) and maintains a navigation history.

The identity manager 410 is responsible for maintaining identities of a telespace's member. As noted above, an identity is the name, and corresponding URL, by which each user is known by others. Individual users may have one or many identities. The identity manager 410 maintains a record or table, preferably in XML, of the identities. The identity manager 410 can also maintain a record or table, preferable in XML, of the URL's of telespace members and their corresponding device URL's. Alternatively, a separate member manager can be implemented.

The telespace manager 412 is responsible for managing each of the telespaces 404 that may be opened on the peer unit 314A. Each telespace 404 is an instantiation of one or more activities. Each telespace 404 has a corresponding activity manager 414.

The activity manager 414 is responsible for (a) adding new activities to a telespace, (b) opening existing activities in a telespace, and (c) updating telespace activities from new activity template versions. To add a new activity, the activity manager 414 is provided with the URL of an activity template, opens the template, and extracts and propagates the template information (such as component URLs) into the telespace. The template defines the initial activity configuration for a telespace. A user may add additional activities to the telespace 404 later as needed. After being added, an activity is "part of" the telespace and visible to all telespace members. A telespace has a tag to identify its activity manager and bind the activity manager and data. Preferably, each document has a local registry linked to it, with XML tag names maintained in the registry to express mapping (reference pointers or associations) in an extensible, platform-independent way, between the document and its corresponding telespace. Each telespace member has a framework and an activity template for the telespace available on his or her peer unit 314A–D.

Each activity includes a tool, such as tool 424 and an engine, such as engine 426. The tool 424 provides the user interface (UI) capability for the activity, interacting via UI 406 with a member. UI interaction may include UI events initiated, for example, via the keyboard 156 (FIG. 1) or mouse 157 (FIG. 1). In response to such UI events, the tool 424 may request its corresponding engine 426 to effect data model changes, subscribing to the engine 426 for asynchronous data change notifications for updating UIs asynchronously when data changes occur. A tool 424 also implements application program interfaces (APIs) for interacting with background services provided under the direction of the controller manager 418. The engine 426 is responsible for maintaining and changing the data that supports the telespace 404 and/or results from user interaction obtained through the tool. The engine 426 can modify persistent model data, and emit asynchronous data change notifications to the tool 424, both under the direction and control of the dynamics manager 420, as will be explained below. The storage manager 416 controls access to the stored data.

For creation of an activity template, a software developer may write or adapt a tool and engine for use within the framework. An activity template is a persistent representation of the tool and engine components comprising an activity. An activity template can be distributed, for example, as shrink wrapped software or downloaded, for example, over the Internet to peer unit 314A from a remote server. Activity components can be regarded as Web documents and are represented persistently via URLs. The activity template itself preferably has a URL, which allows for tracking activity design changes. The activity template can be a single activity template or an activity collection template. A single activity template pertains to only one activity, such as "chat". An activity collection template pertains to a collection of activities, such as "chat and outline".

For use, the ABC system 400 gets a member's identity via the identity manager 410, opens a telespace manager, requests the telespace manager to open a telespace via a URL, requests the telespace manager for an activity manager, and, then, the activity manager opens an activity, typically by using the activity's URL. Then, the ABC system 400 is ready for members to use the telespace to perform the shared, focused tasks offered by the particular activity.

Figure 5:
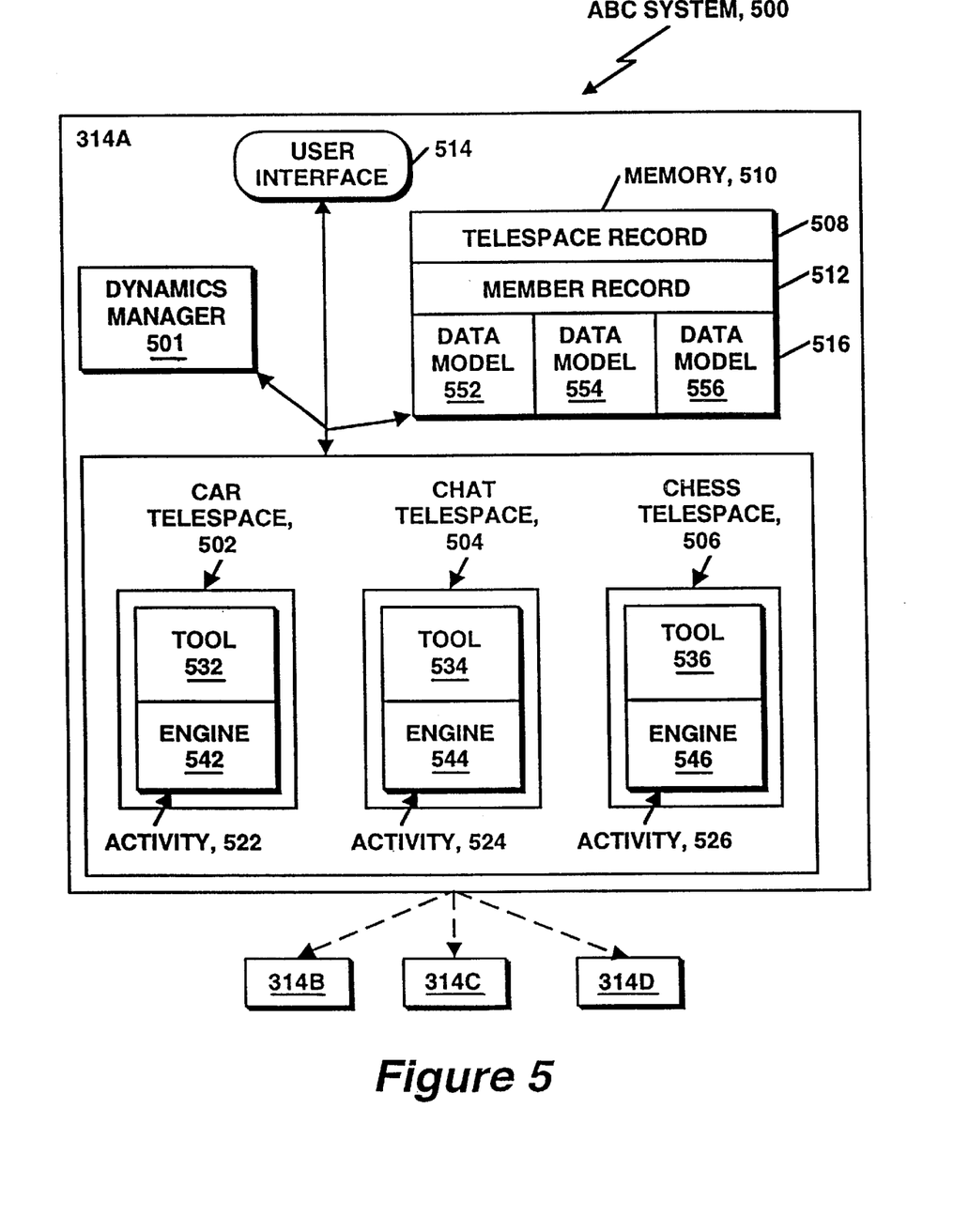
FIG. 5 is a block diagram of a portion of ABC system as implemented on the computer system of FIG. 1, and illustrating typical telespace applications in accordance with an embodiment of the invention.

FIG. 5 shows an exemplary, multi-telespace use of an ABC system 500 on peer units 314A–D. It should be understood that the ABC system 500 is a distributed system. As such, while a description is provided of components only of peer unit 314A, peer units 314B–D have analogous components, and no separate description of them is necessary.

As shown for peer unit 314A, the ABC system 500 includes a number of illustrative telespaces in which peer unit 314A is subscribed as a member, including a car designing telespace 502, a chat telespace 504, and a chess playing telespace 506.

As also shown, peer unit 314 has a number of components used during operation of the telespaces 502, 504, 506. Peer unit 314A has a memory 510 that maintains a telespace record 508, which lists and describes each of the telespaces 502, 504, 506 in which it is member, and a member record 512, which lists and describes each of the identities of telespace members that may participate in those telespaces. A UI 512 can receive user-initiated changes to the telespace and member records 508, 514.

Each of the telespaces 502, 504, 506 instantiates a different one of the illustrated activities 522, 524, 526. (Alternatively, the illustrated activites 522, 524, 526 could reside in a single telespace, in which case all members of the single telespace would have access to each of the activities.) Each activity 522, 524, 526 includes a respective tool 532, 534, 536 specific to the activity, and under control of a respective engine 542, 544, 546 for carrying out changes to a corresponding data model 552, 554, 556 contained in memory 510, and which is persisted in each of the telespaces 502, 504, 506. For example, the car design telespace 502 is an instance of an activity 522 that can include a tool 532 in the form of CAD (computer-aided design) software, and the chess-playing telespace 506 is an instance of an activity 526 that can include a tool 536 in the form of a software chess game.

Users pursue the activities 522, 524, 526 of the telespaces 502, 504, 506, via the user interface 514, which interfaces with the tools 532, 534, 536 for providing the tools with user requests. Responsive to the requests, the engines 542, 544, 546 change the persistent state of a corresponding data model 552, 554, 556 in memory 510, under the control of the dynamics manager 501 to reflect a current state. For example, the persistent state of the data for the chess-playing telespace 506 might include a chess board and locations of the chess pieces on the board; a user request may specify a chess piece move, which constitutes a change in the data, i.e., a delta; and the current state would reflect the execution of the delta and the consummation of the move.

Figure 6:
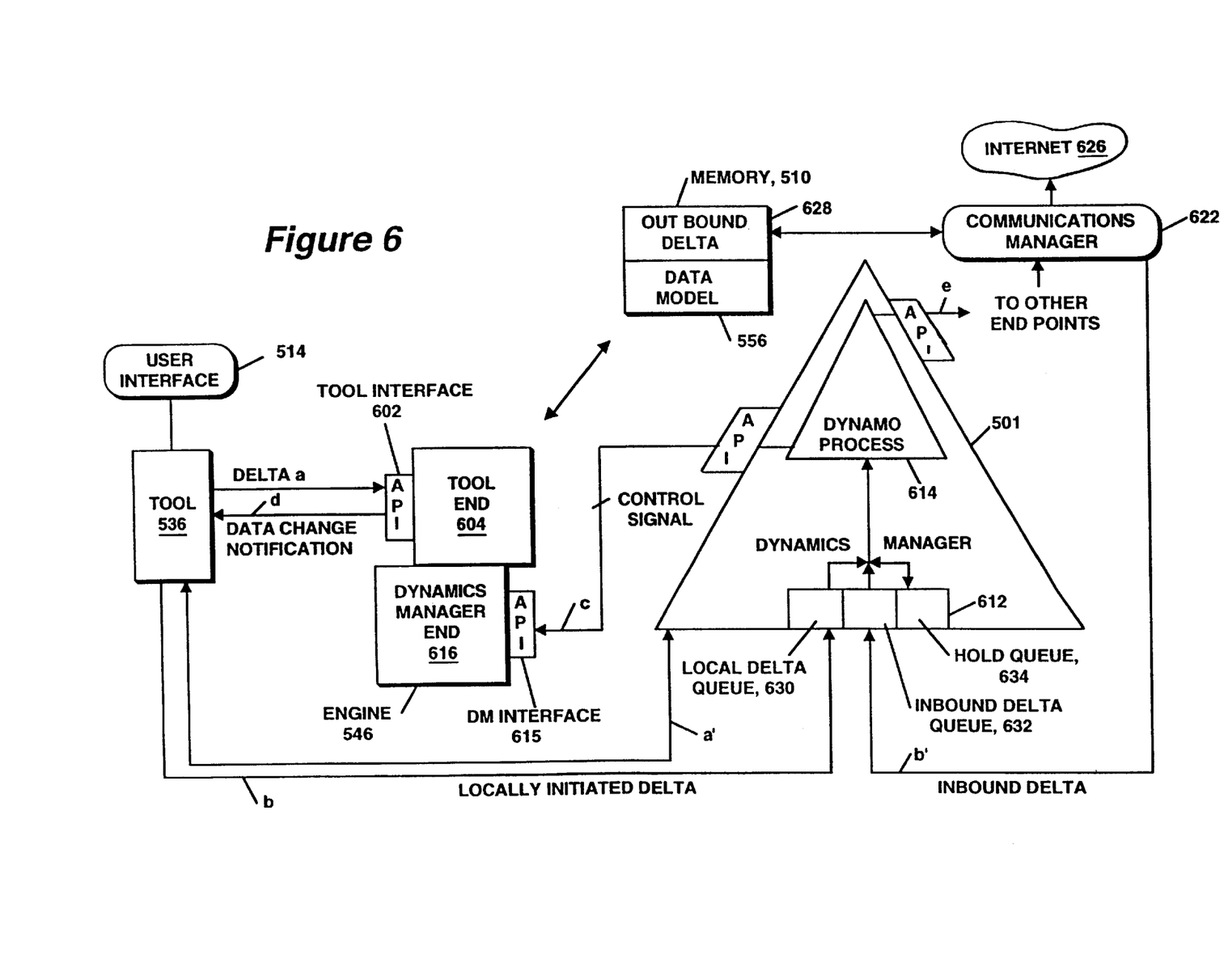
FIG. 6 is a block diagram of a portion of the ABC system as implemented for the chess telespace of FIG. 5.

FIG. 6 illustrates the operation of the ABC system 500, with reference to components thereof located in the peer unit 314A and described with respect to FIG. 5. The engine 546 presents to the tool 536 potential actions or options (e.g., chess piece moves) that can be implemented in furtherance of the particular focused task of the activity 526. The tool 536 interacts with a user who is a member of telespace 506 (as recorded in the member record 512) through the user interface 514, presenting a view of the activity (e.g., a view of the chessboard, and, possibly, a list of moves). In response to a user input, called a user gesture, (e.g., move BISHOP from X to Y) entered via the user interface 514, the tool 536 records a user selection in memory by causing a delta to be generated and stored in the system. A delta is a unit of requested change, preferably, in the form of a container object. Container objects are well known by those familiar with object-oriented programming techniques. The tool 536 is responsible for determining the granularity of the change requested in the delta. The delta container object can hold (contain) one or more commands for carrying out the change, in addition to user-specified data, e.g., an identification of a particular chess piece and the original and target locations on the board constituting a move of that chess piece. Upon generation, the delta is empty of any commands, and itself constitutes merely a request for change until filled with the appropriate commands by the engine 546 to effectuate the change. It is the responsibility of the engine 546 to record in the delta in an engine-specific way (which need not be known to the tool 536) the commands required to effect the change.

More specifically, as indicated by line "a'", the tool 536 initiates creation of a delta by requesting its generation by the dynamics manager 501. The dynamics manager 501 creates the delta and returns it over line a' to the tool 536, and may record the created delta in case fault recovery is required.

As indicated at line "a" of FIG. 6, the tool 536 passes control of the delta through a tool interface 602 to a tool-end 604 of the engine 546, thereby invoking the engine. (This description shall from time to time state that deltas are passed or that control to deltas shall pass from one component to another. Preferably, the deltas are objects allocated in memory whose pointer is passed as XML elements.) The engine's tool interface 602 exposes a set of application programming interfaces for creating commands that can effectuate the requested change encoded in the delta, or, in other words, for filling a delta with appropriate, typically engine-specific commands in serial form to fulfill the user's intent. The engine 546 then passes control of the delta, now filled with the commands, back to the tool 536.

As indicated at line "b" of FIG. 6, the tool 536 passes control of (i.e., submits) the filled delta to the dynamics manager 501 for execution. The dynamics manager 501 may also receive inbound deltas over line "b'" from other peer units 314B–D. The dynamics manager 501, along with the dynamics managers in peer units 314B–D, are responsible for maintaining consistency of executed changes to the data model 556 from one end of the ABC system to the other for all members who participate in the chess game telespace.

The dynamics manager 501 includes queue structures 612 and a dynamo process 614, preferably a computer-executable program containing the main logic of the dynamics manager. The dynamics manager 501, and its dynamo process 614, are in bi-directional communication with the communications manager 622. The dynamics manager 501 enqueues the received deltas in the queue structures 612 for ordering purposes, then the dynamo process 614 services the queue structure in processing the enqueued deltas, and directing the engine 546 to execute them in an appropriate order. More specifically, the dynamo process 614 of dynamics manager 501 sends a control signal in the form of a "delta command execution" message through the interface 615 to the dynamics manager end 616 of the engine 546 over line "c" of FIG. 6. The delta command execution message directs the engine 546 to proceed with execution of the delta received from the tool 536 by making the requested change to the data model 556 contained in the memory 510, and which is persisted in the telespace.

The dynamo process 614 of dynamics manager 501 also disseminates all locally-initiated deltas to other endpoints via the communications manager 622, which transmits them over the network, e.g., 626 to the peer units 314B–D. At each peer unit 314B–D, the respective dynamics manager enqueues received deltas in its local queue structures, and then passes them in a specified order to its respective engine for execution.

A single dynamics manager can support a single telespace or multiple telespaces, depending on the application, and thus can be responsible for directing a number of engines to execute deltas for the various telespaces. In systems having multiple telespaces, as illustrated in FIG. 5, the dynamics manager 501 determines which engine should execute a delta by examining the delta's information. The delta contains commands that are identified to a specific one of the engines, and tagged with an engine identifier or code carried in the delta's payload. When the enqueued delta is processed by the dynamics manager, the dynamics manager associates the engine code with the referenced delta, and directs the delta's execution by the appropriate engine.

Finally, as indicated at line "d" of FIG. 6, the engine 546 sends a "data change notification" message to notify the tool 536 of the execution of the delta, and of a new current state of the data in the data model 556. The data change notification can be made by value or reference. That is, the notification can include the new data values themselves or can include a pointer to the new data in memory. In response to the notification, the tool 536 causes the user interface 514 to make the change available to the user, e.g., by displaying the move on a chess board graphic. If a user is viewing the display 170 (FIG. 1), the user will be able to see the change to the chess game caused by execution of the delta; otherwise, the change is effected to the data in memory 510 without the user "seeing" the change at the time it is made.

Preferably, at substantially the same time that the change is being made by engine 546 to the data model 556 stored in memory 556 of peer unit 314A, the other peer units 314B–D are making the analogous change to their locally stored data so as to effect the intent of the delta in a consistent manner. Situations may arise where one or another of the peer units 314A–D is not connected to the network, e.g., the Internet. Where the peer unit 314A may be disconnected, the communications manager 622 employs a presence detector 430 to ascertain whether the peer unit 314A is connected and, if not, stores outbound deltas in an outbound delta store 628 until such time as connection is restored, and then transmits the stored deltas. Where one or more destination peer units 314B–D are disconnected from the network, the communications manager 622 of peer unit 314A can proceed to transmit the outbound delta to relay 316 (FIG. 3) without regard to whether the other peer units are disconnected. The relay 316 (FIG. 3) receives all such outbound deltas, stores them as necessary in an outbound delta store 318 (FIG. 3), and forward them upon the destination peer unit 314B–D being reconnected. In operation, the communications manager 622 can send all outbound deltas to the URL of the relay 316, and the relay can utilize an on-board look-up table 320 to ascertain the endpoint URL of the destination peer unit 314B–D to be used for relaying the delta. The relay service can be provided, in practice, by an Internet Service Provider (ISP) or other Internet organizations.

It can be seen that, as between the tool 536 and the engine 546, user interface activities are effected directly only via the tool 536 and data model changes are effected directly only via the engine 546. In the vernacular, the tool 536 "owns" the UI and the engine 546 "owns" the data model. This can be contrasted with current, typical applications as illustrated in FIG. 2. For example, spreadsheet programs today typically combine the functions of the tool and the engine rather than separating them as in the foregoing embodiment of the invention. By separating the tool from the engine, and thus the UI from the data model, the dynamics manager can intervene and mediate between deltas originating from the various peer units, e.g., for purposes of maintaining data consistency. Moreover, separation of the tool from the engine permits the process of execution of deltas to be carried out asynchronously. This is useful because it takes time for the dynamics manager 501 and engine 546 to carry out their responsibilities in a manner, e.g., that will maintain data consistency for all telespace members. It is also useful because inbound deltas from other peer units 314B–D can affect timing of execution of locally-initiated deltas.

The ABC system can be multitasking and multithreading in that each tool-engine combination forming an activity can correspond to a separate dynamics manager, and multiple dynamics managers can be provided to accommodate multiple simultaneously operating activities. While a one-to-one relationship between telespaces and dynamics managers may introduce the least latency in handling deltas, thread starvation could give rise to an error or fault condition. On the other hand, single dynamics managers supporting many telespaces could give rise to congestion problems. The optimal numbers of each component will depend on the hardware application, number of participating peer units, and traffic conditions.

The ABC system can comprise plural computer systems (CS), each with one or more telespaces (TS), each instantiating one or more activity components, each activity component having a tool (T), engine (E) pair, whose operation is coordinated by a dynamics manager (DM). Thus, the ABC system can have multiple telespaces with one or more dynamics managers. Accordingly, the ABC system can be formed, for example, as follows:

$$\text{ABC system} = CS_1 = DM_1 + A_1, \quad \text{where } A_1 = T_1 + E_1$$
$$CS_2 = DM_2 + A_2, \quad \text{where } A_2 = T_2 + E_2$$
$$\vdots$$
$$CS_n = DM_n + A_n, \quad \text{where } A_n = T_n + E_n$$

where all the activities $A, A_2$ $_{and\ An}$ reside in one or more telespaces, and "n" is a positive integer. Thus, by way of illustration, the following are examples of various telespace instantiations:

$$TS \subset A_1, \text{ or}$$
$$TS \subset A_1 + A_2 \text{ or}$$
$$TS \subset A_1 + A_2 \cdots A_m.$$
$$\text{or}$$
$$TS_1 \subset A_1$$
$$TS_2 \subset A_2$$
$$\vdots$$
$$\cdots, \text{ and}$$
$$TS_m \subset A_m$$

where the symbol "$\subset$" means "a set comprising", and "m" is a positive integer. Accordingly, each telespace can instantiate of one or more activities, and the framework can have a single telespace; alternatively, each telespace can instantiate of one or more activities, and the framework can have multiple telespaces.

A software implementation of components of the above-described embodiment may comprise computer instructions and routines either fixed on a tangible medium, such as a computer-readable media, e.g. the diskette 142, CD-ROM 147, ROM 115, or fixed disk 152 of FIG. 1, or transmittable via a modem or other interface device, such as communications adapter 190 connected to the network 195 over a medium 191. Medium 191 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. A local network-capable device for use in an activity-based collaboration system, the activity-based collaboration system including a plurality of network-capable devices including the local network-capable device and a plurality of remote network-capable devices at a plurality of locations, each network-capable device responsive to a user, the local network-capable device comprising:
   A) a memory for storing a local copy of data in accordance with a data model;
   B) a tool, responsive to a user interaction, for initiating generation of a plurality of locally-generated data change requests;
   C) a data-change engine coupled with the memory and the tool, and responsive to the locally generated data change requests and a plurality of remotely-generated data change requests, for controlling storage of a local copy of data in the memory in accordance with the data model, and making changes to the local copy of the data; and
   D) a dynamics manager, coupled with the tool and the data-change engine, and responsive to the locally-generated and remotely-generated data change requests, for controlling the engine and coordinating execution of the locally-generated and remotely-generated data change requests.

2. The local network-capable device in accordance with claim 1, wherein the data is stored in a persistent state in a non-volatile memory device comprising the memory.

3. The local network-capable device in accordance with claim 1, wherein the data is stored in XML format.

4. The local network-capable device in accordance with claim 1, further comprising a first telespace associated with the local copy of the data; said first telespace comprising an instantiation of a first activity, said activity comprising said tool and said engine.

5. The local network-capable device with claim 4, further comprising a member record for storing identities of telespace members, and an identity manager for managing the member record.

6. The local network-capable device in accordance with claim 4, further comprising a second telespace; said second telespace comprising an instantiation of a second activity; said second activity comprising:
   A) a second tool, responsive to a user interaction, for generating a second data change request;
   B) a second data-change engine coupled with the memory and the second tool, and responsive to the second data change request, for controlling storage of a second local copy of data in the memory in accordance with a second data model, and making changes to the second local copy of the data.

7. The local network-capable device in accordance with claim 6, further comprising a telespace record for storing identifications of the first and second telespaces.

8. The local network-capable device in accordance with claim 6, wherein the locally-generated and remotely-generated data change requests each comprise a container object, and the container object contains an engine identifier for identifying one of the first and second telespaces; and, responsive to the engine identifier, the dynamics manager directs the identified engine to execute the locally-generated and remotely-generated data change requests.

9. The local network-capable device in accordance with claim 6, wherein the dynamics manager receives data change requests from both the tool and the second tool.

10. The local network-capable device in accordance with claim 1, wherein the data change requests each comprise a container object initiated by the tool and generated by the dynamics manager, and the data-change engine provides the container object with commands for fulfilling the data change request.

11. The local network-capable device in accordance with claim 1, wherein the local copy of the data associated with the first telepace is stored in a first, allocated space of the memory and the second local copy of the data is stored in a second, allocated space of the memory separate from the first, allocated space.

12. The local network-capable device in accordance with claim 1, wherein the dynamics manager comprises a queue structure for ordering data change requests; and a dynamo process mechanism for controlling the engine and directing making of the changes to the data.

13. The local network-capable device in accordance with claim 12, wherein the dynamo process mechanism, responsive to the queue structure, causes the data change engine to process the data change requests on a first in, first out basis.

14. The local network-capable device in accordance with claim 12, wherein the queue structure includes a first queue for holding pointers to data change requests initiated by the tool, and a second queue for holding pointers to the remotely-generated data change requests.

15. The local network-capable device in accordance with claim 13, wherein the dynamo process mechanism, responsive to the queue structure, causes the data change engine to process received data change requests corresponding to enqueued pointers in the second queue prior to processing locally-generated data change requests corresponding to enqueued pointers in the first queue.

16. The local network-capable device in accordance with claim 1, wherein the data-change engine is implemented separately from the tool; and, as between the tool and the data-change engine, only the tool has access to a user interface and only the data-change engine has access to the data model.

17. The local network-capable device in accordance with claim 1, wherein the local copy of the data comprises a data state; and the data-change engine changes the data state in response to each of a plurality of the data change requests to generate a current data state.

18. The local network-capable device in accordance with claim 1, wherein the data-change engine notifies the tool of the change in the data state, and the tool presents the current data state to a user via a user interface.

19. The local network-capable device in accordance with claim 1, in combination with the remote network-capable devices, and wherein each of the network-capable devices comprises a memory, a tool, a data-change engine, and a dynamics manager as recited in claim 1.

20. The local network-capable device in accordance with claim 19, wherein each of the network-capable devices includes a local copy in memory of the data, and a communications manager for receiving remote data change requests from others of the network-capable devices for changing the local copy of the data.

21. An activity-based collaboration (ABC) system for providing communications and other shared and mutual activities between users in virtual spaces comprising telespaces, said system comprising:
   A) a plurality of network-capable devices connected for communication with one-another, each network-capable device having a memory;
   B) a plurality of substantially identical activities, each of the activities operable on a different one of the network-capable devices for performing a task; each telespace being an instantiation of at least one of the activities; each of the activities including
      1) a tool for generating data change requests, responsive to user interactions, and
      2) a data-change engine, separate from the tool and operating asynchronously therewith, for maintaining telespace data pursuant to a common data model in memory;
   C) a plurality of communications managers, each incorporated in a different one of the network-capable devices for receiving data change requests from others of the network-capable devices and causing data change requests from the tool of the network-capable device incorporating the communications manager to be sent to the others of the network-capable devices; and
   D) a plurality of dynamics managers, each incorporated in a different one of the network-capable devices, and, responsive to the data change requests, for directing the data-change engine operable on the network-capable device in which the dynamics manager is incorporated to make changes to the local copy of data stored in the memory of the network-capable device.

22. A networked system including plural, network-capable devices at different locations connected for communication; each network-capable device comprising:
   A) a memory for storing a local copy of data pursuant to a common data model;
   B) an activity including a tool for generating data change requests, responsive to user interactions, and a data-change engine separate from the tool and operating synchronously therewith for maintaining the data model; and
   C) a dynamics manager, responsive to data change requests generated by all network-capable devices for directing the data-change engine to make changes to the local copy of data stored in the memory so that all local copies of data remain consistent relative to each other.

23. The networked system in accordance with claim 22, wherein the user interactions can be initiated, causing data change requests to be generated, at any of the network-capable devices of the networked system, and each network-capable device further includes a communications manager for causing data change requests generated at the each network-capable device to be sent to each of the other dynamics managers of the network-capable devices.

24. The networked system in accordance with claim 23, wherein the network-capable devices include computer systems.

25. The networked system in accordance with claim 23, further comprising an activity-based communications (ABC) system for interpersonal interaction, comprising plural, network-capable devices connectable via a network, each network-capable device comprising:
   A) a framework including at least one of the dynamics managers;
   B) a plurality of activity components, each comprising one of the activities for performing a specific task, the activity components being operable through common application programming interfaces (API) with the framework.

26. A computer program product for use in each collaborative station of a peer-to-peer collaboration system having a plurality of collaboration stations, each having means for interacting with a user, a local copy of collaborative data and means for directly exchanging data change requests with other collaboration stations, the computer program product comprising a storage media for storing computer program code; and computer program code comprising activity program code for performing an activity comprising a task, the activity program code comprising:
   A) tool program code for initiating data change requests, responsive to user interactions;
   B) dynamics manager program code that receives data change requests both from the tool program code and from other collaboration stations, determines which data change requests should be executed so that collaborative data copies at all collaborative stations remain consistent and issues data-change directions; and
   C) data-change engine program code, for maintaining a local copy of collaborative data pursuant to a data model; the data-cange engine program code including a tool end program code responsive to data change requests for providing notification to the tool program code of data changes and dynamics manager end program code for receiving, from the dynamics manager program code, data-change directions that cause the data change engine program code to make changes to the local copy of collaborative data.

27. An activity-based collaboration method for enabling communications between network-capable devices that share in the performance of a task, each of the devices performing the method comprising the steps of:
   A) storing a local copy of data in a local memory in accordance with a data model;
   B) responsive to a user interaction, a tool initiating a first data change request;
   C) receiving a second data change request from a remote one of the computer systems;
   D) responsive to the first and second data change requests, an engine controlling storage of data in the memory in accordance with the data model, including making changes to the local copy of the data in accordance with the data model; and
   E) responsive to the first and second data change requests, a dynamics manager controlling the engine and coordinating execution of data change requests so that all local copies of data remain consistent.

28. The activity-based collaboration method in accordance with claim 27, further comprising the step of the dynamics manager directing the making of the changes to the data by the data change engine responsive to the data change requests.

29. A distributed, coordinated system comprising a plurality of network-capable devices for maintaining a plurality of copies of data pursuant to a distributed data model, wherein the copies can be changed responsive to users' actions by the network-capable devices, each of the network-capable devices having a local copy of the data and comprising:
   A) a tool for receiving user-requested changes to the data copies stored pursuant to the data model and generating a data change request;
   B) an engine separate from the tool for controlling the local copy of the data, and for making and unmaking changes to the local copy of the data; and
   C) a dynamics manager, responsive to the user-requested changes generated by tools in all of the plurality of network-capable devices, for controlling the engine in making changes to the local copy of the data in accordance with the data model so that all local copies of the data are maintained consistently.

30. A method implemented in a coordinated, distributed collaboration system comprising a plurality of network-capable devices for storing a plurality of copies of data each associated with a different one of a plurality of data-change engines for maintaining the associated copy in accordance with a distributed data model responsive to users' actions, the method comprising the steps of:
   A) at each network capable device, receiving directly from all of the network capable devices, requests for changing data stored locally;
   B) identifying, from an engine code in each request, which among a plurality of the data-change engines in each network-capable device is associated with data that the each request seeks to change; and
   C) invoking the identified engine to effect the requested change in accordance with the data model so that all local data copies are maintained consistently.

31. The system in accordance with claim 30 further comprising the step of effecting the change asynchronously among the network-capable devices with respect to a locally stored copy of the data.

* * * * *